W. W. REYNOLDS.
Portable Weighing Scales.

No. 226,000. Patented Mar. 30, 1880.

Attest,
Geo. H. Graham
W. B. Philipp

Inventor,
W. W. Reynolds,
by Norman Philipp
Attys.

UNITED STATES PATENT OFFICE.

WILLIAM W. REYNOLDS, OF RUTLAND, VERMONT, ASSIGNOR TO HOWE SCALE COMPANY, OF SAME PLACE.

PORTABLE WEIGHING-SCALE.

SPECIFICATION forming part of Letters Patent No. 226,000, dated March 30, 1880.

Application filed January 23, 1880.

*To all whom it may concern:*

Be it known that I, WILLIAM W. REYNOLDS, a citizen of the United States, residing in the city of Rutland, county of Rutland, and State of Vermont, have invented certain new and useful Improvements in Portable Weighing-Scales, fully described and represented in the following specification and the accompanying drawings, forming a part of the same.

Figure 1:
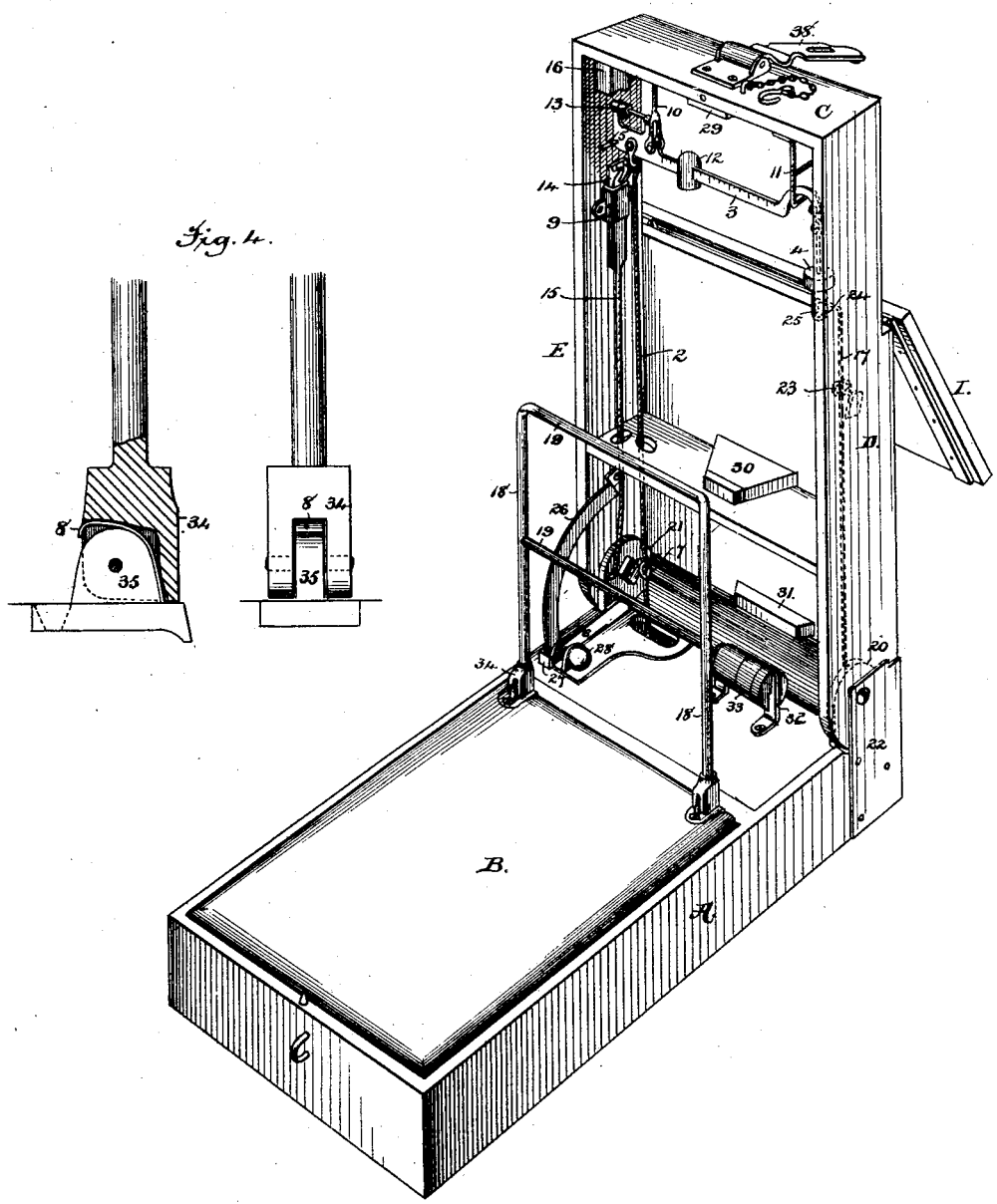
Figure 2:
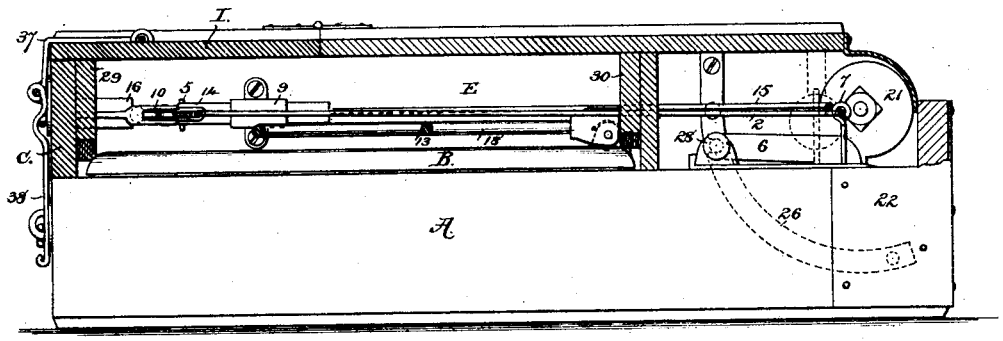
Figure 3:
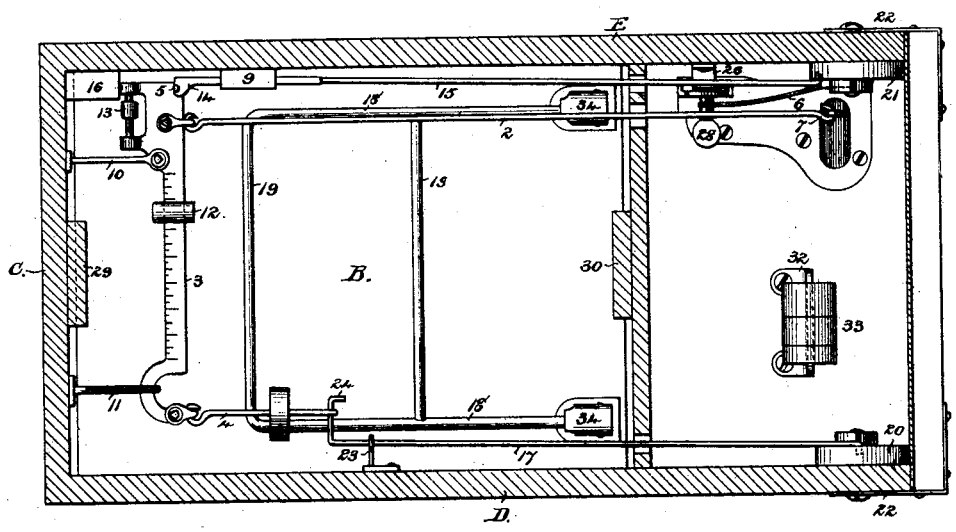

In said drawings, Figure 1 is a perspective view, representing the parts of the scale in operative positions. Fig. 2 is a side elevation, partly in section, of the scale as closed for storage or transportation. Fig. 3 is a plan view of the scale as closed, the top board being removed to expose the parts. Fig. 4 represents the rack-frame hinge by side and end elevations.

This invention relates to that class of weighing-scales which are constructed so that their several parts may be arranged in compact relation with each other, whereby great facility in handling, storing, and transporting may be afforded, and which parts may be readily adjusted to fit the scales for use in weighing articles.

The improvements effected consist in the special means whereby the scale-beam is lifted and sustained off from its pivots when the scale is closed or packed up; in the means for locking the parts open when the scale is arranged for use in weighing; in an improved construction of bag-rack and its hinged connection with the platform; and in the arrangement of the rack for the loose weights and the retaining-head for securing them when the scale is packed.

The base of the scale consists of a rectangular box, A, in which the weighing-platform B is poised in the usual manner upon pivots supported by a system of levers that are hung to the sides of said box A, and to which is attached the steelyard-rod 2, connecting with the short arm of the scale-beam 3.

The scale-beam 3 is suspended by pivots that are seated in bearing-loops at the end of a rod, 10, attached to the head-plate C of a swinging frame, the sides D E of which are hinged to ears 20 21, projecting upward from the base near the rear ends of its sides A, aided or not, as may be desired, by strengthening-plates 22. The long arm of this scale-beam 3 has its play limited by the cross-bars of a loop, 11, depending from the plate C, and it is provided, as usual, with a counterpoise, 4, a sliding poise, 12, and a nut, 13, adjusting the balance. Near the rear end of its short arm the scale-beam is provided with pin-rests 5, which, when the scale is closed, are seated in the saddle 14 of a reciprocating locking-rod, 15, that is pivoted at its lower end to the forward side of the ear 21, and which has its upper or saddle end running through a guide, 9, that is secured on the inner face of the side E, while above the said short arm this side E is provided with a rest-block, 16. Another reciprocating locking-rod, 17, at the opposite side of the swinging frame, is at its lower end pivoted centrally to the eye 20 near the upper edge of its inner face, and at its upper end carries a hook, 24, that enters a loop, 25, depending from the counterpoise 4, said rod being guided by an eye, 23, fastened to the side frame, D.

When the swinging frame is raised, as in Fig. 1, the locking-rods 15 and 17 are out of action and the scale-beam 3 rests upon its pivots, and is free to be vibrated by the movements of the platform B, all parts of the scale being then in operative position. When thus raised the swinging frame is secured firmly in an upright position by means of a locking-quadrant, 26, that is fast to the side E and plays through a socket, 27, in bearers of which plays a sliding bolt, 28, that is pressed inwardly by a spring, 6, said bolt engaging in a hole properly located in said quadrant.

When it is desired to close the scale the bolt 28 is withdrawn against the pressure of its spring 6 and the swinging frame is drawn forward. In this movement of it the steelyard-rod 2 doubles at its joint 7, which joint is located above the platform B at a greater distance than it is situated from the front edge of the side E; hence as said rod is moved forward it relieves the platform B and permits the scale-beam to be moved upward.

As the swinging frame moves forward the rod 15 is moved forward on its pivot, and its upper portion is caused to slide in its guide 9, for the reason that its pivot is fixed forward of the center of motion of the swinging frame. The bifurcated portion of the saddle 14 is thus moved upward to embrace the scale-beam, while its seat receives the pin 5. The short arm of the scale-beam is thus rested in the saddle of the arm 15, and pressed upward by it until the rear end of its heel is forced against the rest-block 16, whereby the rear end of the scale-beam is firmly held.

The rod 17 is simultaneously swung on its pivot and moves forward with the swinging frame, and, as its pivot is fixed to the ear 20 above the center of motion of the swinging frame, it follows that the rod will move downward to engage its hook 24 with the loop 25 of the counterpoise 4, thus drawing the scale-beam down firmly onto the loop 11, and locking the forward end of the scale-beam firmly.

The locking-rod 17, though desirable, may be dispensed with, in which case the counterpoise might be attached to the side D. This done, it will be found that the locking-rod 15 will, while securely holding the rear end of the scale-beam, as described, force the forward end upwardly until it is firmly seated against the upper cross-bar of the loop 11, thus pulling the counterpoise snugly on its fastening and securely holding the parts in place.

So, too, the rod 15 might be omitted and locking-rod 17 alone be depended upon, for it will be found that the strain of the rod 17 will, acting through the counterpoise, with the loop 11 as a fulcrum, raise the rear end of the scale-beam off from its pivots and press the same snugly against the block 16, and thus securely hold the parts in place. For the greater security, however, of all the parts, both locking-rods 15 17 should be employed.

The platform B is supplied with a bag-frame that consists of uprights 18 and cross-bars 19, which frame is so hinged to the platform B that it may be raised to an upright position for service, or be swung down onto said platform in packing up the scale. The uprights are provided with recessed shoes 34, that embrace and are pivoted to lugs 35 rising from the platform B. Springs 8 are attached to these lugs, so that their free ends will bear against the upper wall of the recess in the shoe 34 and sustain the bag-frame in its upright position, and will, when said frame is swung forward, rest against the rear wall of such recess.

The rack 32 for the loose weights 33 is fastened to the base of the scale in such a position that a packing-head, 31, will be brought to bear upon the top of the weights when the scale is closed up.

Other packing-heads, 29 30, attached to the back of the swinging frame, are arranged in such positions that when the scale is closed up they will rest upon the platform B and secure it from moving or its levers from becoming displaced or injured.

By means of these devices the scale may be closed and securely packed up in small compass, the locking-rod 15 holding the scale-beam off from its pivots, and operating, in connection with the rest-block 16 and the locking-rod 17, to sustain such beam from lateral or longitudinal displacement, the packing-heads 29 30 31 securing the platform, its levers, and the loose weights from any injurious movement when the scale is subjected to the violence resulting from transportation.

The upper end of this scale may be supplied with a hinged door, I, whereby greater facility of operating the scale is afforded, as appears from Fig. 1. Any means for locking this door closed and the swinging frame to the base A may be employed, that shown being a loop, 37, attached to the door so as to embrace the hasp 38, that secures the swinging frame closed.

What is claimed is—

1. The combination, with the swinging frame and the scale-beam hung thereto, of the locking-rod 15, which is operated by the forward or closing movement of said frame to press the short arm of the scale-beam upward, substantially as described.

2. The combination, with the swinging frame and the scale-beam hung thereto, of the locking-rod 17, which is operated by the forward or closing movement of said frame to draw the forward end of the scale-beam downward, substantially as described.

3. The combination, with the swinging frame and the scale-beam hung thereto, of the locking-rods 15 and 17, which are operated by the forward or closing movement of said frame, the former to press the short arm of the scale-beam upward and the latter to draw the forward end of the scale-beam downward, all substantially as described.

4. The combination, with the swinging frame carrying the scale-beam, and the base carrying the platform, of the locking quadrant, substantially as described.

5. The combination, with the platform B and the swinging frame, of the hinged bag-rack, substantially as described.

6. The combination, with the uprights 18 of the bag-frame and their recessed shoes 34, of the lugs 35 and springs 8, substantially as described.

7. The combination, with the swinging frame and the base of the scale, of the weight-rack 32 and the packing-head 31, substantially as described.

In testimony whereof I have hereunto set my hand in the presence of two subscribing witnesses.

WM. W. REYNOLDS.

Witnesses:
GEO. F. PEASE,
W. R. PAGE.